(12) United States Patent
Bando et al.

(10) Patent No.: US 9,365,076 B2
(45) Date of Patent: Jun. 14, 2016

(54) OMNI-DIRECTIONAL WHEEL AND OMNI-DIRECTIONAL VEHICLE INCLUDING THE SAME

(71) Applicant: WHILL, Inc., Tsurumi-ku, Yokohama-shi (JP)

(72) Inventors: Kazuo Bando, Kanagawa (JP); Junpei Naito, Kanagawa (JP)

(73) Assignee: WHILL, Inc., Tsurumi-ku, Yokohama-shi (JP)

( * ) Notice: Subject to any disclaimer, the term of this patent is extended or adjusted under 35 U.S.C. 154(b) by 0 days.

(21) Appl. No.: 14/531,730

(22) Filed: Nov. 3, 2014

(65) Prior Publication Data

US 2015/0130260 A1  May 14, 2015

(30) Foreign Application Priority Data

Nov. 8, 2013  (JP) ................................. 2013-232303

(51) Int. Cl.
*B60B 19/00* (2006.01)
*B60B 19/12* (2006.01)

(52) U.S. Cl.
CPC ............... *B60B 19/003* (2013.01); *B60B 19/12* (2013.01); *B60B 2900/131* (2013.01)

(58) Field of Classification Search
CPC .. B60B 19/003; B60B 19/12; B60B 2900/131
USPC ....................................................... 301/5.23
See application file for complete search history.

(56) References Cited

U.S. PATENT DOCUMENTS

| | | | | |
|---|---|---|---|---|
| 5,383,715 A | * | 1/1995 | Homma | ............. B60B 19/003 301/5.1 |
| 5,979,993 A | * | 11/1999 | Huang | ................... B60C 5/001 152/329 |
| 6,309,025 B1 | * | 10/2001 | Huang | .................. A63C 17/22 152/323 |
| 7,621,355 B2 | * | 11/2009 | Chu | ..................... B60B 19/003 180/7.2 |

(Continued)

FOREIGN PATENT DOCUMENTS

| | | |
|---|---|---|
| DE | 10 2011 053903 | 3/2013 |
| EP | 1 182 057 | 2/2002 |

(Continued)

OTHER PUBLICATIONS

Extended European Search Report for Application No. EP 14191698, dated Apr. 4, 2015 in 6 pages.
Extended European Search Report for Application No. EP 14191698, dated Apr. 10, 2015 in 6 pages.

*Primary Examiner* — S. Joseph Morano
*Assistant Examiner* — Jean Charleston
(74) *Attorney, Agent, or Firm* — Knobbe, Martens, Olson & Bear, LLP

(57) ABSTRACT

Provided is an omni-directional wheel including a substantially cylindrical hub provided so as to be rotatable around an axle; a plurality of rollers which have axes extending in a direction intersecting a radial direction of the hub and of each of which an outline has a curvature equal to a curvature of a circle centered at the axle; a support part which allows the rollers to be mounted so as to be rotatable around the respective axes, which supports the rollers such that the outlines are arranged on a single circumference; and rubber tubes which are held between and in contact between the outer circumferential surface of a cylindrical part of the hub and the inner circumferential surface of the support part in the radial direction.

7 Claims, 5 Drawing Sheets

(56) References Cited

U.S. PATENT DOCUMENTS

| | | | | |
|---|---|---|---|---|
| 8,460,154 B2* | 6/2013 | Gomi | ................ | B60B 9/06 180/21 |
| 8,758,191 B2* | 6/2014 | Takenaka | ............ | B60B 19/003 280/7.1 |
| 8,827,375 B2* | 9/2014 | Takenaka | ............ | B60B 19/003 301/5.23 |
| 2007/0261897 A1* | 11/2007 | Torita | ............ | A61G 5/045 180/6.5 |
| 2008/0018167 A1 | 1/2008 | Fuji | | |
| 2013/0257138 A1 | 10/2013 | Chang | | |

FOREIGN PATENT DOCUMENTS

| | | |
|---|---|---|
| JP | 02-063901 | 3/1990 |
| JP | 2004-009818 | 1/2001 |
| JP | 2001-191704 | 7/2001 |
| JP | 2004-009818 | 1/2004 |
| JP | 36-82248 | 5/2005 |
| JP | 2006-168659 | 6/2006 |
| JP | 2008 290638 | 12/2008 |
| WO | WO 93/02872 | 2/1993 |
| WO | WO 2006/068007 | 6/2006 |

* cited by examiner

OMNI-DIRECTIONAL WHEEL AND OMNI-DIRECTIONAL VEHICLE INCLUDING THE SAME

CROSS-REFERENCE TO RELATED APPLICATIONS

This application is based on Japanese Patent Application No. 2013-232303, the contents of which are incorporated herein by reference in its entirety.

TECHNICAL FIELD

The present disclosure relates to an omni-directional wheel and an omni-directional vehicle including the same.

BACKGROUND ART

Conventionally, there is known a wheel with multiple rotary bodies, each rotary body rotating in a lateral direction perpendicular to the straight forward direction of a vehicle and disposed around an axle (e.g., see Patent Literature 1).

In the wheel with rotary bodies described in Patent Literature 1, the movement of the vehicle in all directions on the ground surface is enabled by an appropriate combination of the movement of the vehicle in the straight forward direction and the movement in the lateral direction perpendicular to the straight forward direction.

CITATION LIST

Patent Literature

{PTL 1}
The Publication of Japanese Patent No. 3682248

SUMMARY

Technical Problem

In the wheel with rotary bodies described in Patent Literature 1, the rotary bodies are molded from a synthetic resin, or an outer cylinder part which is molded from rubber, etc. is disposed around a core part molded from the synthetic resin. The rotary bodies are fixed on a rim 2 through a bearing arm 20 and fixed on an axle 1 through the rim 2. Vibration, etc. from the ground surface of the wheel which is transmitted from the rotary bodies to the bearing arm 20 is directly transmitted through the axle 1 to the vehicle.

Since the size of the rotary body is small as compared with the size of the entire wheel, it is difficult to equip the rotary body with a vibration isolation function of sufficiently absorbing vibration, etc. from the ground surface. As the vibration, etc. from the ground surface which is not absorbed by the rotary bodies is directly transmitted to the vehicle, the ride comfort is degraded when the wheel rides over a step or travels on a bad road.

As disclosed herein, an omni-directional wheel, which can give improved ride comfort by suppressing transmission of vibration, etc. from the ground surface to the axle, and an omni-directional vehicle including this omni-directional wheel are provided.

Solution to Problem

In order to achieve the above object, the present disclosure provides the following solutions:

An omni-directional wheel according to one aspect of the present disclosure includes: a substantially cylindrical hub part provided so as to be rotatable around an axle; a plurality of rollers which have axes extending in a direction intersecting a radial direction of the hub part in a plane perpendicular to the axle, each of the plurality of rollers making an outline which has a curvature equal to a curvature of a circle centered around the axle; a support part which allows the rollers to be mounted so as to be rotatable around the respective axes, the support part supporting the rollers such that the outlines are arranged on a single circumference, the support part having an inner circumferential surface larger in diameter than an outer circumferential surface of the hub part; and an elastic member which is held between and in contact between the outer circumferential surface of the hub part and the inner circumferential surface of the support part in the radial direction.

According to the omni-directional wheel related to the one aspect of the present disclosure, vibration, etc. which is transmitted from the ground surface to the rollers is transmitted to the substantially annular elastic member through the inner circumferential surface of the support part which allows the rollers to be mounted so as to be rotatable around the axes. The vibration, etc. transmitted from the ground surface to the rollers is partly absorbed by the elastic member, and thereafter is transmitted through the elastic member to the outer circumferential surface of the substantially cylindrical hub part which is provided so as to be rotatable around the axle.

Thus, according to the omni-directional wheel related to the one aspect of the present disclosure, the elastic member is interposed between the rollers, to which the vibration, etc. from the ground surface is transmitted, and the hub part, which is provided so as to be rotatable around the axle, so that the vibration, etc. from the ground surface can be prevented from being transmitted directly to the hub part.

Therefore, it is possible to provide an omni-directional wheel which can give improved ride comfort by suppressing transmission of vibration, etc. from the ground surface to the axle.

In the omni-directional wheel of this aspect, the omni-directional wheel may include: a pair of first restriction members which are fixed on one of the hub part and the support part and which are disposed in contact with both end faces of the elastic member in a direction of the axle; and a second restriction member which is fixed on the other one of the hub part and the support part and is disposed between the pair of first restriction members in the direction of the axle, wherein the elastic member may include a first elastic member which is held between and in contact between one of the first restriction members and the second restriction member in the direction of the axle; and a second elastic member which is held between and in contact between the other first restriction member and the second restriction member in the direction of the axle.

According to the above-described configuration, when at least one of the hub part and the support part is subjected to an external force moving in the direction of the axle, the first or second elastic member, which is held between and in contact between one of the pair of first restriction members and the second restriction member in the direction of the axle, contracts and generates a reaction force acting against the external force. Due to the action of this reaction force, even when at least one of the hub part and the support part is subjected to the external force moving in the direction of the axle, the external force is absorbed by the first or second elastic member, so that the relative positions of the hub part and the support part in the axle direction are retained.

In the omni-directional wheel of the above-described aspect, the elastic member may be a foamed sponge body or a hollow tube with gas sealed inside.

In this way, transmission of vibration, etc., which is transmitted from the rollers, to the axle can be suppressed by means of the foamed sponge body or the hollow tube with gas sealed inside.

In the omni-directional wheel of this aspect, the elastic member may be a substantially annular member.

In this way, the elastic member is held between the outer circumferential surface of the hub part and the inner circumferential surface of the support part over the entire circumference, so that transmission of vibration, etc. from the ground surface directly to the hub part can be more reliably suppressed.

In the above-described configuration, the elastic member may be a substantially annular member including a plurality of arc members divided in a circumferential direction.

In this way, it is possible to form the elastic member with small members of the same shape and thereby reduce the manufacturing cost of the elastic member.

In the omni-directional wheel of this aspect, the elastic member may include a plurality of arc members of an arc shape disposed at intervals on a common circumference.

In this way, the size of the elastic member can be made smaller compared with the case where the substantially annular elastic member is disposed over the entire common circumference.

An omni-directional vehicle of one aspect of the present disclosure includes one of the above-described omni-directional wheels.

In this way, it is possible to provide an omni-directional vehicle including an omni-directional wheel which can give improved ride comfort by suppressing transmission of vibration, etc. from the ground surface to the axle.

Advantageous Effects

According to the present disclosure, an advantage is afforded in that an omni-directional wheel, which can give the improved ride comfort by suppressing transmission of vibration, etc. from the ground surface to the axle, and an omni-directional vehicle including this omni-directional wheel can be provided.

DESCRIPTION OF EMBODIMENTS

Figure 1:
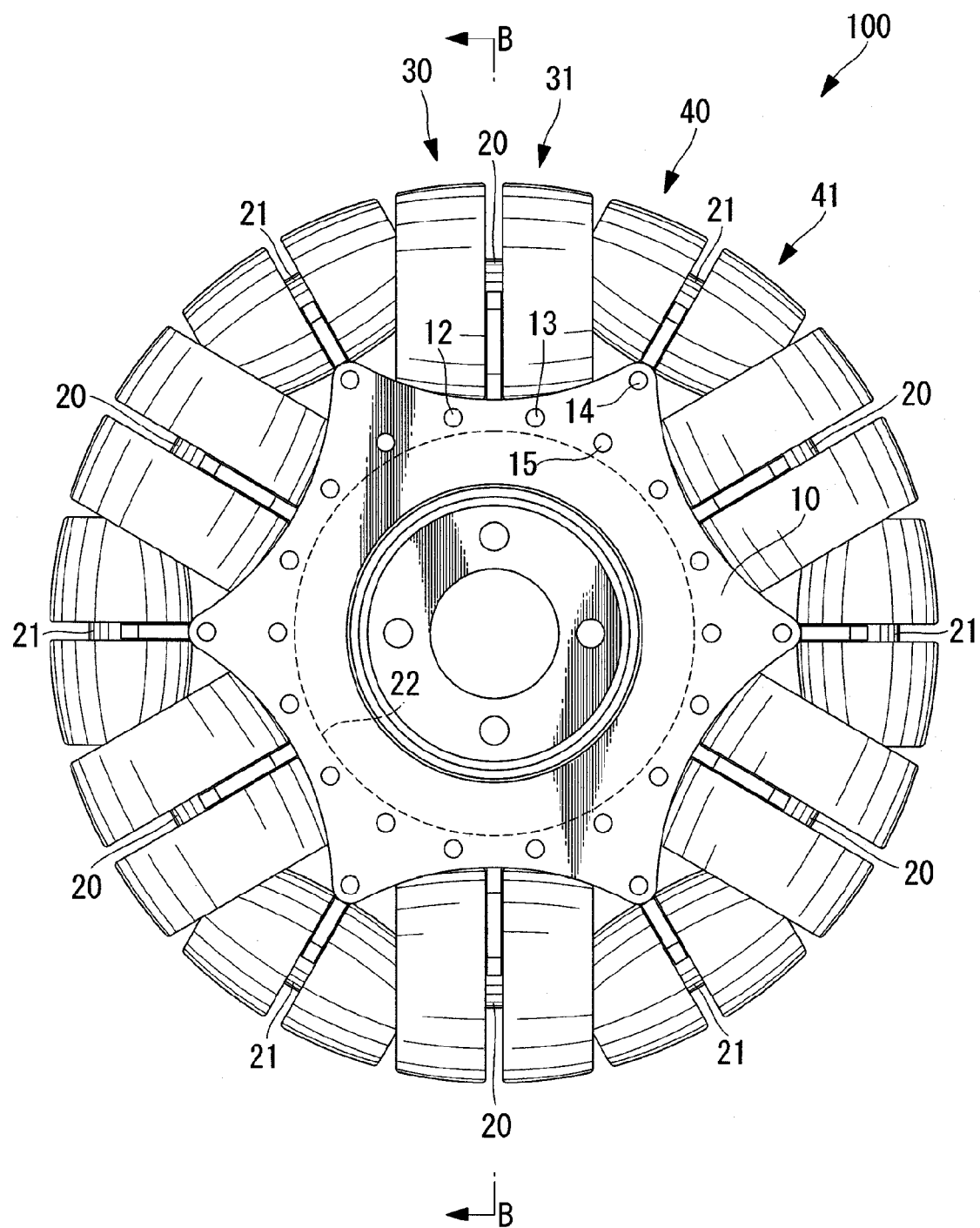
FIG. 1 is a front view showing an omni-directional wheel of one embodiment.

In the following, an omni-directional wheel 100 of one embodiment of the present disclosure will be described with reference to the drawings.

The omni-directional wheel 100 according to this embodiment is a wheel which is coupled to a vehicle with other wheels and functions as a driven wheel during travel of the vehicle. The omni-directional wheel 100 is mounted so as to be rotatable around the axle A shown in FIG. 3.

The omni-directional wheel 100 functions as a driven wheel, for example, in a vehicle with two rear wheels as driving wheels and one or two front wheel(s) as driven wheel(s). Alternatively, the omni-directional wheels 100 function in a four-wheeled vehicle as two front driven wheels to which a driving force is transmitted through a belt, etc. from the two rear driving wheels.

As will be described later, the omni-directional wheel 100 includes plate-like members 10 and 11 which are provided so as to be rotatable around the axle A, and multiple rollers which have axes extending in a direction perpendicular to the radial direction of the plate-like members 10 and 11 in a plane perpendicular to the axle A. The omni-directional wheel 100 can move along the axle A direction as the multiple rollers rotate around the respective axes upon receiving a force in the axle A direction.

Thus, the omni-directional wheel 100, by rotating around the axle A, not only allows a vehicle to move in a direction perpendicular to the axle A but also allows the vehicle to move along the axle A direction. Through the combination of rotation around the axle A and movement along the axle A direction, a vehicle including the omni-directional wheel 100 (omni-directional vehicle) is capable of moving in all directions on the ground surface of the vehicle.

Next, the specific configuration of the omni-directional wheel 100 according to this embodiment will be described.

The omni-directional wheel according to this embodiment includes: an annular hub 50 which is fixed on a bearing part (indicated by the broken line in FIG. 4); a roller assembly which is disposed at a distance on the outside in the radial direction of the hub 50; and an annular rubber tube 51 (first elastic member) and an annular rubber tube 52 (second elastic member) which are disposed at positions where they are held between the roller assembly and the hub 50 in the radial direction.

Figure 3:
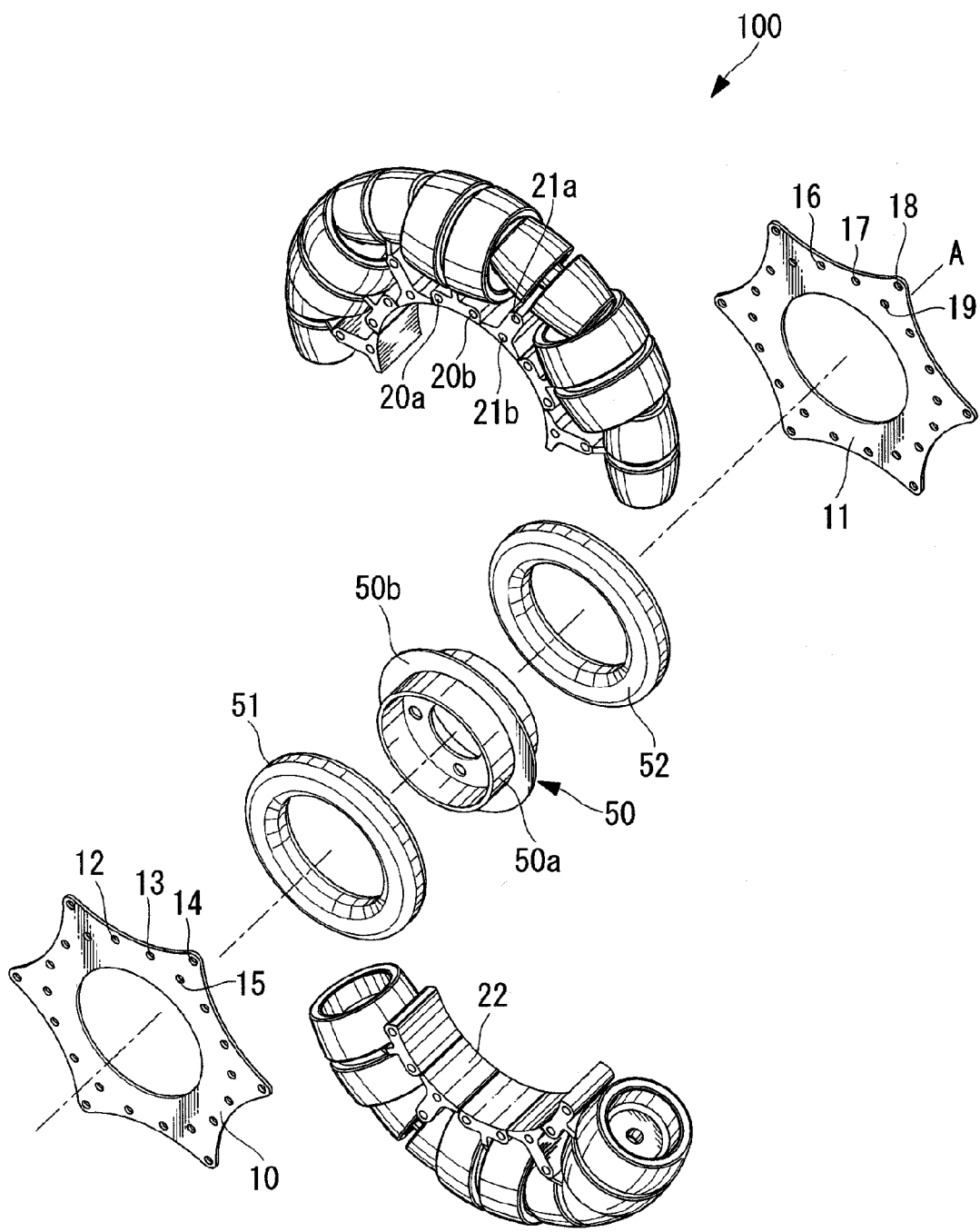
FIG. 3 is an exploded perspective view of the omni-directional wheel shown in FIG. 1.
Figure 4:
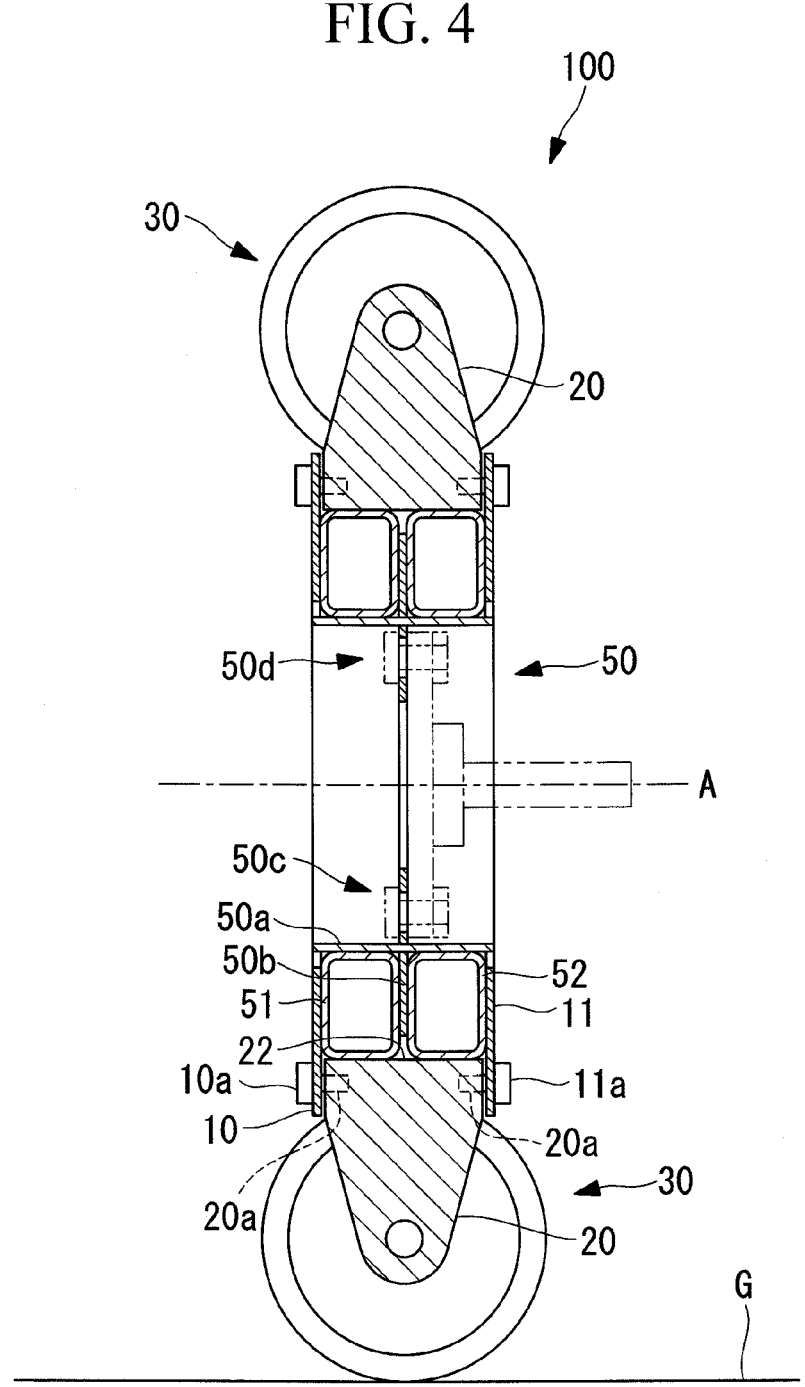
FIG. 4 is a cross-sectional view along the line B-B of the omni-directional wheel shown in FIG. 1.

The hub 50 is a substantially cylindrical member which is provided so as to be rotatable around the axle A, and is coupled with the bearing part (indicated by the broken line in FIG. 4) which is disposed coaxially with the axle A. As shown in FIG. 3 and FIG. 4, the hub 50 is constituted of a cylindrical part 50a, which is disposed coaxially with the axle A, and an annular part 50b, which is disposed in a plane perpendicular to the axle A. The annular part 50b is disposed roughly at the center of the cylindrical part 50a in the axle A direction.

The roller assembly includes a pair of large-diameter rollers 30 and 31 and a first support member 20 which allows these rollers to be mounted on the plate-like members 10 and 11, and a pair of small-diameter rollers 40 and 41 and a second support member 21 which allows these rollers to be mounted on the plate-like members 10 and 11. The first support member 20 and the second support member 21 support the rollers such that the outlines of the pair of large-diameter rollers 30 and 31 and of the pair of small-diameter rollers 40 and 41 are arranged on a single circumference.

The rubber tubes 51 and 52 are substantially annular hollow members which are held between and in contact between the outer circumferential surface of the hub 50 and the inner circumferential surfaces of the first and second support members 20 and 21 (support parts) in the radial direction. The rubber tubes 51 and 52 are filled with gas (e.g., air) sealed at a predetermined pressure. The inner circumferential surfaces of the rubber tubes 51 and 52 are disposed in contact with the outer circumferential surface of the hub 50. The outer circumferential surfaces of the rubber tubes 51 and 52 are disposed in contact with the inner circumferential surfaces of the first support member 20 and the second support member 21 constituting the roller assembly.

Thus, the rubber tubes 51 and 52 are disposed in contact with each of the hub 50 and the roller assembly. Therefore, when a driving force rotating around the axle A is transmitted from the bearing part (not shown) to the hub 50, the driving force is transmitted through the rubber tubes 51 and 52 to the first support member 20 and the second support member 21, causing the omni-directional wheel 100 to rotate around the axle A.

Next, the configuration of the roller assembly will be described in detail.

Figure 2:
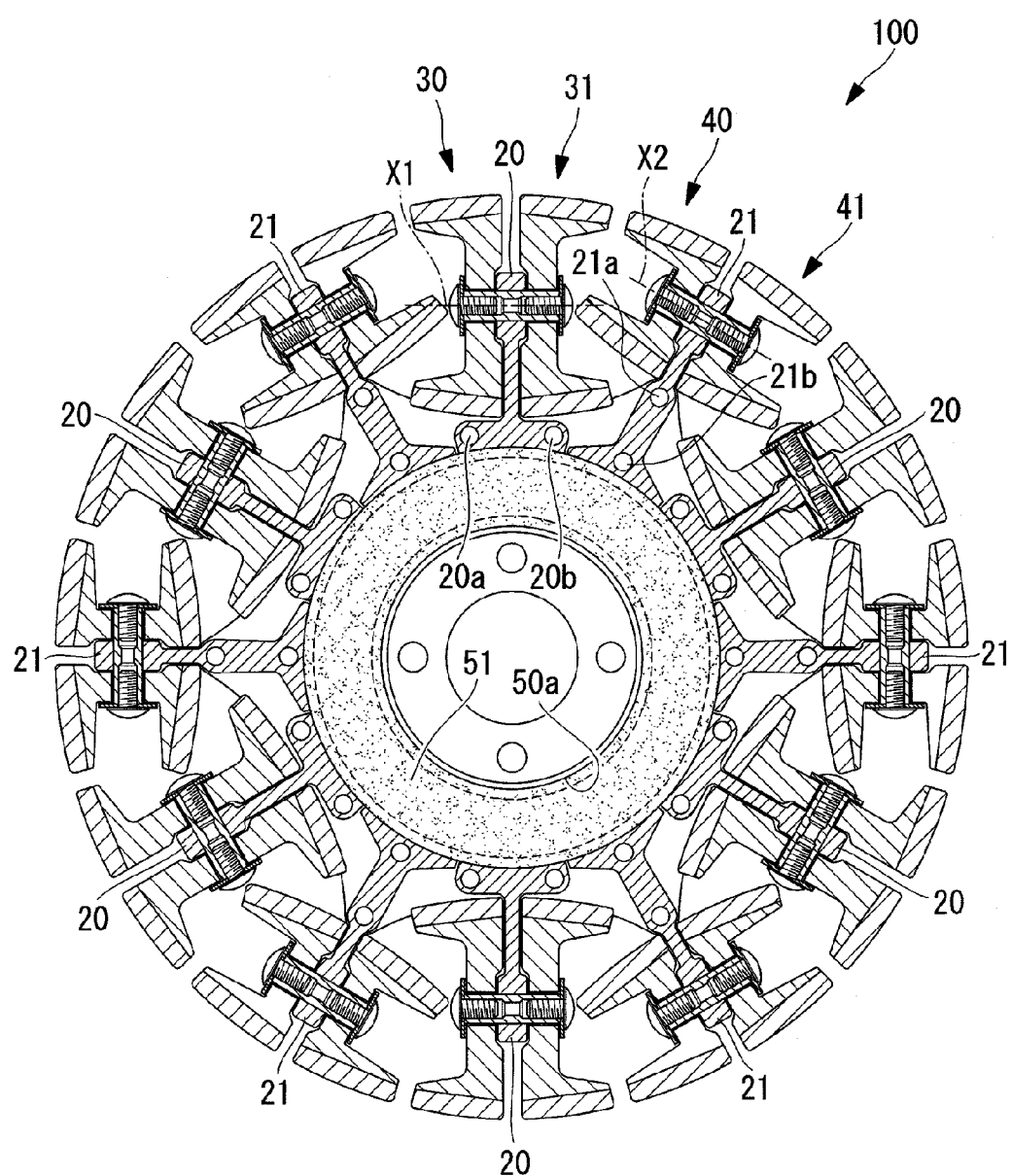
FIG. 2 is a cross-sectional view of the omni-directional wheel shown in FIG. 1.

As shown in FIG. 2, the pair of large-diameter rollers 30 and 31 included in the roller assembly has the axis X1 extending in a direction perpendicular to (intersecting) the radial direction of the plate-like members 10 and 11 in a plane perpendicular to the axle A. As shown in FIG. 2, the pair of small-diameter rollers 40 and 41 included in the roller assembly has the axis X2 extending in a direction perpendicular to (intersecting) the radial direction of the plate-like members 10 and 11 in a plane perpendicular to the axle A.

The pair of large-diameter rollers 30 and 31 is mounted through the first support member 20 (support part) on the plate-like members 10 and 11 so as to be rotatable around the axis X1. The pair of small-diameter rollers 40 and 41 is mounted through the second support member 21 (support part) on the plate-like members 10 and 11 so as to be rotatable around the axis X2.

As shown in FIG. 1 to FIG. 3, the first support member 20 is disposed at a position where it is held between the pair of large-diameter rollers 30 and 31 having their large diameter-side end faces facing each other, and supports the large-diameter rollers 30 and 31. Similarly, the second support member 21 is disposed at a position where it is held between the pair of small-diameter rollers 40 and 41 having their large diameter-side end faces facing each other, and supports the small-diameter rollers 40 and 41.

The first support members 20 and the second support members 21 are alternately disposed in the circumferential direction of the plate-like members 10 and 11. The first support members 20 and the second support members 21 are disposed at intervals of 30° around the axle A.

As shown in FIG. 2, the multiple first support members 20 and the multiple second support members 21 constituting the roller assembly have an inner circumferential surface 22 larger in diameter than the outer circumferential surface of the cylindrical part 50a of the hub 50. In the front view shown in FIG. 1, the inner circumferential surface 22 is disposed on the circumference indicated by the dotted line in the drawing.

As shown in FIG. 1 to FIG. 3, the large-diameter rollers 30 and 31 and the small-diameter rollers 40 and 41 have a shape of which the outline has a curvature equal to the curvature of a circle centered at the axle A.

Thus, the roller assembly has an outline of a shape having a curvature equal to the curvature of a circle centered at the axle A, and each of the rollers rotates around the axis extending in a direction perpendicular to the radial direction of the plate-like members 10 and 11. Therefore, the omni-directional wheel 100 including the roller assembly can move in a direction along the axle A.

Next, the plate-like members 10 and 11 on which the multiple first support members 20 and the multiple second support members 21 are fixed will be described.

The plate-like members 10 and 11 (a pair of first restriction members) shown in FIG. 1 and FIG. 3 are plate-like members which are provided so as to be rotatable around the axle A in a plane perpendicular to the axle A. As shown in FIG. 1 and FIG. 3, the plate-like member 10 is provided with multiple through-holes 12, 13, 14, and 15, and the plate-like member 11 is provided with multiple through-holes 16, 17, 18, and 19. In FIG. 3, for easy understanding of the structure of the omni-directional wheel 100, the large-diameter rollers 30 and 31 and the small-diameter rollers 40 and 41 to be described later are partially disconnected.

The through-holes 12 and 13 of the plate-like member 10 correspond respectively to fastening holes 20a and 20b of the first support member 20. Fastening screws (not shown) having a male thread formed on the outer circumferential surface are inserted into the through-holes 12 and 13 and fastened to the fastening holes 20a and 20b, and thereby the first support member 20 is fixed on the plate-like member 10. The fastening holes 20a and 20b of the first support member 20 penetrate the first support member 20 in the axle A direction shown in FIG. 3 and respectively face the through-holes 16 and 17 of the plate-like member 11. Fastening screws (not shown) having a male thread formed on the outer circumferential surface are inserted into the through-holes 16 and 17 and are fastened to the fastening holes 20a and 20b, and thereby the first support member 20 is fixed on the plate-like member 11.

The through-holes 14 and 15 of the plate-like member 10 correspond respectively to fastening holes 21a and 21b of the second support member 21 to be described later. Fastening screws (not shown) having a male thread formed on the outer circumferential surface are inserted into the through-holes 14 and 15 and fastened to the fastening holes 21a and 21b, and thereby the second support member 21 is fixed on the plate-like member 10. The fastening holes 21a and 21b of the second support member 21 penetrate the second support member 21 in the axle A direction shown in FIG. 3 and respectively face the through-holes 18 and 19 of the plate-like member 11. Fastening screws (not shown) having a male thread formed on the outer circumferential surface are inserted into the through-holes 18 and 19 and fastened to the fastening holes 21a and 21b, and thereby the second support member 21 is fixed on the plate-like member 11.

Thus, the multiple first support members 20 and the multiple second support members 21 are fixed while being held between the plate-like member 10 and the plate-like member 11. A hub 50 and the rubber tubes 51 and 52, which are disposed on both sides of the hub 50 in the axle A direction, are fixed while being held between the plate-like member 10 and the plate-like member 11.

Next, the arrangement of the rubber tube 51 and the rubber tube 52 will be described with reference to FIG. 3 and FIG. 4.

FIG. 4 is a cross-sectional view along the line B-B of the omni-directional wheel shown in FIG. 1.

As shown in FIG. 4, the rubber tubes 51 and 52 are held between and in contact between the outer circumferential surface of the cylindrical part 50a of the hub 50 and the inner circumferential surfaces 22 of the first and second support members 20 and 21 in the radial direction of the hub 50 (the direction perpendicular to the axle A in FIG. 4).

The annular part 50b of the hub 50 is provided with through-holes 50c and 50d in a portion closer to the axle A than the cylindrical part 50a. As fastening screws are inserted into the through-holes 50c and 50d and fastened to fastening holes provided in the bearing part, the hub 50 is fixed on the bearing part. The broken line shown in FIG. 4 indicates the fastening screws which are inserted into the through-holes 50c and 50d and the bearing part on which the hub 50 is fixed.

As shown in FIG. 4, as a fastening screw 10a is fastened through the through-hole 12 to the fastening hole 20a, the plate-like member 10 is fixed on the first support member 20. Similarly, as a fastening screw 11a is fastened through the through-hole 16 to the fastening hole 20a, the plate-like member 11 is fixed on the first support member 20. As the plate-like members 10 and 11 are fixed on the first support member 20, one end face in the axle A direction of the rubber tube 51 comes into contact with the plate-like member 10, while one end face in the axle A direction of the rubber tube 52 comes into contact with the plate-like member 11. Thus, the plate-like members 10 and 11 (pair of first restriction members) are disposed in contact with both end faces in the axle A direction of the rubber tubes 51 and 52 (elastic members).

The annular part 50b (second restriction member) of the hub 50 is fixed on the hub 50 and is disposed between the plate-like members 10 and 11 in the axle A direction.

The rubber tube 51 is held between and in contact between the plate-like member 10 and the annular part 50b in the axle A direction. Similarly, the rubber tube 52 is held between and in contact between the plate-like member 11 and the annular part 50b in the axle A direction.

FIG. 4 is a cross-sectional view along the line B-B of the omni-directional wheel 100 shown in FIG. 1 and is a view showing a state where the large-diameter rollers 30 and 31 are grounded on the ground surface G. While not shown, the state where the small-rollers 40 and 41 are grounded on the ground surface G is similar to the state shown in FIG. 4.

Thus, the rubber tubes 51 and 52 are disposed at positions where they are held by the roller assembly and the hub 50 in the radial direction. The rubber tube 51 is disposed at a position where it is held by the plate-like member 10 and the annular part 50b in the axle A direction, while the rubber tube 52 is disposed at a position where it is held between the plate-like member 11 and the annular part 50b in the axle A direction.

In the above description, the plate-like members 10 and 11 are fixed on the first and second support members 20 and 21. Instead of this, the plate-like members 10 and 11 may be fixed at both ends in the axle A direction of the cylindrical part 50a of the hub 50. If the plate-like members 10 and 11 are fixed on the hub 50, the need for the annular part 50b of the hub 50 is eliminated, but instead, a member equivalent to the annular part 50b should be fixed on the inner circumferential surfaces of the first and second support members 20 and 21.

Thus, the plate-like members 10 and 11 (pair of first restriction members) only have to be fixed either on the first and second support members 20 and 21 or on the hub 50. In addition, the annular part 50b (second restriction member) only has to be fixed on the other one of the first and second support members 20 and 21 and the hub 50.

The effects and advantages afforded by the omni-directional wheel 100 of this embodiment having been described above will be described.

According to the omni-directional wheel 100 of this embodiment, vibration, etc. transmitted from the ground surface G to the large-diameter rollers 30 and 31 and the small-diameter rollers 40 and 41 is transmitted through the inner circumferential surfaces 22 of the first and second support members 20 and 21, which allow the rollers to be mounted so as to be rotatable around the axes X1 and X2, to the substantially annular rubber tubes 51 and 52. The vibration, etc. transmitted from the ground surface G to the large-diameter rollers 30 and 31 and the small-diameter rollers 40 and 41 is partly absorbed by the rubber tubes 51 and 52, and is thereafter transmitted through the substantially annular rubber tubes 51 and 52 to the outer circumferential surface of the cylindrical part 50a of the substantially cylindrical hub 50 which is provided so as to be rotatable around the axle A.

Thus, according to the omni-directional wheel 100 of this embodiment, the rubber tubes 51 and 52 are interposed between the large-diameter rollers 30 and 31 and the small-diameter rollers 40 and 41, to which vibration, etc. from the ground surface G is transmitted, and the hub 50, which is provided so as to be rotatable around the axle A, so that the vibration, etc. from the ground surface G can be prevented from being transmitted directly to the hub 50.

Therefore, it is possible to provide the omni-directional wheel 100 which can give improved ride comfort by suppressing transmission of the vibration, etc. from the ground surface G to the axle A.

Moreover, according to the omni-directional wheel 100 of this embodiment, when at least one of the hub 50 and the support part (first support member 20, second support member 21) is subjected to an external force moving in the axle A direction, the rubber tube 51 or the rubber tube 52, which is held between and in contact between one of the pair of plate-like members 10 and 11 and the annular part 50b of the hub 50 in the axle A direction, contracts. As a result of this contraction, the rubber tube 51 or the rubber tube 52 generates a reaction force acting against the above-mentioned external force. Due to the action of this reaction force, even when at least one of the hub 50 and the support part (first support member 20, second support member 21) is subjected to an external force moving in the axle A direction, the external force is absorbed by the rubber tube 51 or the rubber tube 52. Accordingly, the relative positions of the hub 50 and the support part (first support member 20, second support member 21) in the axle A direction are retained.

OTHER EMBODIMENTS

In the above-described embodiment, the hollow rubber tubes 51 and 52 with gas sealed inside are used as the annular members which are held between and in contact between the hub 50 and the inner circumferential surfaces of the first and second support members 20 and 21 in the radial direction; however, this aspect may be different.

For example, a foamed sponge body of urethane foam, etc. may be used as the annular member which is held between and in contact between the hub 50 and the inner circumferential surfaces of the first and second support members 20 and 21 in the radial direction.

Figure 5:
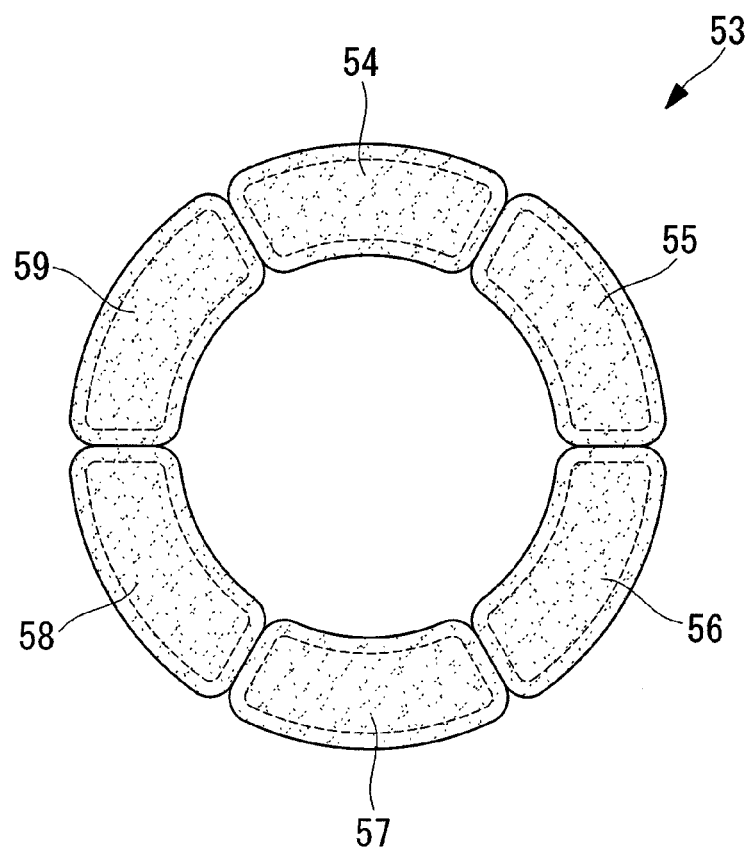
FIG. 5 is a front view showing a rubber tube according to another embodiment.

In the above-described embodiment, as shown in FIG. 2 and FIG. 3, the rubber tubes 51 and 52 are single annular members which are not divided in the circumferential direction; however, this aspect may be different. For example, as shown in FIG. 5, each of the rubber tubes 51 and 52 may be an annular rubber tube 53 (annular member) including multiple (six in the example shown in FIG. 5) arc members 54, 55, 56, 57, 58, and 59 divided in the circumferential direction. In this case, each of the arc members 54, 55, 56, 57, 58, and 59 includes a space in which gas is sealed at a predetermined pressure. The arc members 54, 55, 56, 57, 58, and 59 are disposed in contact with adjacent other arc members at both end faces in the circumferential direction.

In this way, it is possible to form the arc members 54, 55, 56, 57, 58, and 59 as small members of the same shape, and thereby to reduce the manufacturing cost. In addition, even when one of the arc members 54, 55, 56, 57, 58, and 59 is damaged, only the damaged member has to be replaced.

In this aspect, the member held between the outer circumferential surface of the hub 50 and the inner circumferential surfaces of the first and second support members 20 and 21 may be a member which does not include the arc members 55, 57, and 59 of the arc members 54, 55, 56, 57, 58, and 59. In this case, the arc members 54, 56, and 58 should be arranged on a common circumference at regular intervals.

In this way, the number of the arc members can be reduced as compared with the case where the arc members 54, 55, 56, 57, 58, and 59 are arranged on the entire common circumference as shown in FIG. 5.

The invention claimed is:

1. An omni-directional wheel comprising:
   a substantially cylindrical hub part provided so as to be rotatable around an axle;
   a plurality of rollers which have axes extending in a direction intersecting a radial direction of the hub part in a plane perpendicular to the axle, each of the plurality of rollers making an outline which has a curvature equal to a curvature of a circle centered around the axle;
   a support part which allows the rollers to be mounted so as to be rotatable around the respective axes, the support part supporting the rollers such that the outlines are arranged on a single circumference, the support part having an inner circumferential surface larger in diameter than an outer circumferential surface of the hub part;
   an elastic member which is held between and in contact between the outer circumferential surface of the hub part and the inner circumferential surface of the support part in the radial direction;
   a pair of first restriction members which are fixed on one of the hub part and the support part and which are disposed in contact with both end faces of the elastic member in a direction of the axle; and
   a second restriction member which is fixed on the other one of the hub part and the support part and which is disposed between the pair of first restriction members in the direction of the axle, wherein the elastic member includes:
      a first elastic member which is held between and in contact between one of the first restriction members and the second restriction member in the direction of the axle; and
      a second elastic member which is held between and in contact between the other first restriction member and the second restriction member in the direction of the axle,
         wherein inner circumferential surfaces of the first elastic member and the second elastic member are disposed in contact with the outer circumferential surface of the hub part, and
         wherein outer circumferential surfaces of the first elastic member and the second elastic member are disposed in contact with the inner circumferential surface of the support part.

2. The omni-directional wheel according to claim 1, wherein the elastic member is a foamed sponge body or a hollow tube with gas sealed inside.

3. The omni-directional wheel according to claim 2, wherein the elastic member includes a plurality of arc members of an arc shape which are disposed on a common circumference at intervals.

4. The omni-directional wheel according to claim 1, wherein the elastic member is a substantially annular member.

5. The omni-directional wheel according to claim 4, wherein the elastic member is a substantially annular member including a plurality of arc members divided in a circumferential direction.

6. The omni-directional wheel according to claim 1, wherein the elastic member includes a plurality of arc members of an arc shape which are disposed on a common circumference at intervals.

7. An omni-directional vehicle comprising the omni-directional wheel according to claim 1.

* * * * *